US012762424B2

(12) United States Patent
Narain

(10) Patent No.: US 12,762,424 B2
(45) Date of Patent: Oct. 13, 2026

(54) SYSTEM AND METHOD FOR OPTIMIZING MULTI-DOMAIN MACHINE LEARNING MODELS

(71) Applicant: Profformance Technologies Private Limited, Gurugram (IN)

(72) Inventor: Sahil Narain, Gurgaon (IN)

(73) Assignee: Profformance Technologies Private Limited, Gurugram (IN)

( * ) Notice: Subject to any disclaimer, the term of this patent is extended or adjusted under 35 U.S.C. 154(b) by 0 days.

(21) Appl. No.: 19/567,125

(22) Filed: Mar. 14, 2026

(65) Prior Publication Data

US 2026/0289321 A1 Sep. 24, 2026

(30) Foreign Application Priority Data

Mar. 18, 2025 (IN) ............................ 202511024921

(51) Int. Cl.

| | |
|---|---|
| ***G06N 3/045*** | (2023.01) |
| ***G06N 3/048*** | (2023.01) |
| ***G06N 3/0495*** | (2023.01) |
| ***G06N 3/092*** | (2023.01) |

(52) U.S. Cl.

CPC ............. *G06N 3/092* (2023.01); *G06N 3/045* (2023.01); *G06N 3/048* (2023.01); *G06N 3/0495* (2023.01)

(58) Field of Classification Search

CPC ...... G06N 3/045; G06N 3/048; G06N 3/0495; G06N 3/092

See application file for complete search history.

(56) References Cited

U.S. PATENT DOCUMENTS

2019/0095488 A1* 3/2019 Bhattacharjee ....... G06F 16/951
2020/0042896 A1 2/2020 Ko et al.

FOREIGN PATENT DOCUMENTS

CN 111931922 A1 11/2020

OTHER PUBLICATIONS

Ismail Qusai, et al.,"Arabic News Summarization based on T5 Transformer Approach", Proceedings of the 14th International Conference on Information and Communication Systems (ICICS) , Nov. 21-23, 2023, 7 pages.

Gondra, Iker, "Applying machine learning to software fault-proneness prediction," Journal of Systems and Software, vol. 81, No. 2, Feb. 2008, pp. 186-195.

First Examination Report issued for Indian Patent Application No. IN202511024921, dated Apr. 22, 2025, 7 pages.

Hearing Notice issued for Indian Patent Application No. IN202511024921, dated Jan. 7, 2026, 3 pages.

* cited by examiner

*Primary Examiner* — Grace Park

(74) *Attorney, Agent, or Firm* — RC Trademark Company

(57) ABSTRACT

The system for optimizing multi-domain machine learning models determines layer-specific precision levels for each neural network layer of a trained machine learning model based on activation values during forward propagation with validation data. The precision levels are assigned according to a predetermined priority order to create a quantized machine learning model. The system trains a meta-learning model to predict software library configurations using the trained machine learning model. The meta-learning model identifies required software libraries based on hardware specifications and specific tasks for the target device. The system dynamically links the software libraries with the quantized machine learning model for deployment on the target device, enabling autonomous operation.

19 Claims, 3 Drawing Sheets

SYSTEM AND METHOD FOR OPTIMIZING MULTI-DOMAIN MACHINE LEARNING MODELS

TECHNICAL FIELD

The present disclosure relates to a field of machine learning inference and, more particularly, to a system and a method for optimizing multi-domain machine learning models.

BACKGROUND

Machine learning (ML) inference on resource-constrained devices has emerged as a valuable area of technological development, particularly as artificial intelligence applications expand beyond high-performance computing environments. Resource-constrained devices such as edge Internet of Things (IoT) devices, mobile devices, and serverless computing frameworks have limitations in processing capabilities, memory resources, and energy constraints. Despite such limitations, there is a growing demand for deploying machine learning models on resource-constrained devices to reduce costs, and to enable real-time decision-making, and reduce dependency on cloud connectivity.

Existing approaches to machine learning deployment require significant computational resources, with models often occupying thousands of megabytes of memory and demanding significant processing power. The existing techniques used for model compression and improvement include quantization techniques, pruning methods and knowledge distillation approach. The quantization techniques reduce numerical precision, pruning methods remove redundant connections, and the knowledge distillation transfers knowledge from high memory consumption models to less memory consumption models. However, the existing techniques used for model compression and improvement apply uniform strategies across all model components without considering the varying usefulness of different neural network layers to overall inference quality. Furthermore, the existing machine learning frameworks often include numerous libraries (for example, pandas, torch, tensor flow) for training models rather than inference. The unused libraries in such computing frameworks provide unnecessary memory overhead. When the machine learning model is deployed across multiple domains (such as image recognition, natural language processing, and audio analysis), the machine learning model fails to suitably address the requirements of different problem types while maintaining acceptable performance metrics.

The limitations of existing techniques become apparent when considering cross-domain applications, where a single machine learning model deployment may need to handle various types of inputs and tasks. The existing approaches often require domain-specific improvement or separate models for each task type, increasing memory requirements and management complexity. Additionally, existing computing frameworks prioritize either performance or resource efficiency but are inefficient in balancing both considerations effectively. Further, hardware-specific improvement often requires extensive manual tuning and lacks adaptability to different deployment environments, thereby limiting the existing techniques.

Therefore, in light of the foregoing discussion, there exists a need to overcome the aforementioned drawbacks.

SUMMARY

The present disclosure provides a system and a method for optimizing multi-domain machine learning models. The present disclosure seeks to provide a solution to the existing technical problem of how to run machine learning inference on resource-constrained environments like serverless deployments and edge IoT devices. The present disclosure aims to provide a solution that overcomes, at least partially, the problems encountered in the prior art and provides an improved system and an improved method for optimizing multi-domain machine learning models, featuring a quantized machine learning model deployed on a target device.

One or more objectives of the present disclosure are achieved by the solutions provided in the enclosed independent claims. Advantageous implementations of the present disclosure are further defined in the dependent claims.

In one aspect, the present disclosure provides a system for optimizing multi-domain machine learning models, comprising:

one or more processors configured to:

- cause a meta-model to determine layer-specific precision levels for each neural network layer of a plurality of neural network layers of a trained machine learning model based on measured output activation values produced by each neural network layer during forward propagation with a validation dataset;
- assign the determined layer-specific precision levels to each neural network layer according to a predetermined priority order to create a quantized machine learning model;
- train a meta-learning model using the trained machine learning model to predict software library configurations;
- utilize the trained meta-learning model to identify a predefined set of software libraries required for operation based on hardware specifications of a target device and specific tasks to be executed on the target device;
- dynamically link the identified predefined set of software libraries with the quantized machine learning model, wherein the quantized machine learning model with the dynamically linked predefined set of software libraries is deployed on the target device to enable autonomous operation of the target device.

The layer-specific precision determination based on measured output activation values during forward propagation creates quantized machine learning models with reduced computational requirements while preserving accuracy. The reinforcement learning-based meta-model predicts and identifies required software libraries according to the hardware specifications of the target device and execution tasks, eliminating unnecessary components. The system employs strategic checkpoint evaluation at critical network layers to measure accuracy degradation and implement adaptive precision allocation based on the significance of each layer. The dependency graph-based dynamic library linking ensures optimal resource utilization by mapping relationships between software libraries and loading only vital components when needed, then unloading them when operations are completed. The combined approach of precision customization at the neural network layer level and intelligent software library management enables cross-domain functionality, supporting multiple input types such as image classification, text processing, and audio analysis within a single optimized model on a common runtime framework. The comprehensive optimization strategy results in reduced memory footprint, decreased computational overhead, and maintained model performance across heterogeneous deployment targets while enabling truly offline operation on resource-constrained environments. The system delivers autonomous operation capabilities on target devices by precisely matching the quantized machine learning model characteristics to available hardware resources and specific operational needs, making it suitable for both edge IoT devices and serverless frameworks without sacrificing benchmark performance metrics.

In another aspect, the present disclosure provides a method for optimizing multi-domain machine learning models, comprising:

causing, by one or more processors, a meta-model to determine layer-specific precision levels for each neural network layer of a plurality of neural network layers of a trained machine learning model based on measured output activation values produced by each neural network layer during forward propagation with a validation dataset;

assigning, by the one or more processors, the determined layer-specific precision levels to each neural network layer according to a predetermined priority order to create a quantized machine learning model;

training, by the one or more processors, a meta-learning model using the trained machine learning model to predict software library configurations;

utilizing, by the one or more processors, the trained meta-learning model to identify a predefined set of software libraries required for operation based on hardware specifications of a target device and specific tasks to be executed on the target device;

dynamically linking, by the one or more processors, the identified predefined set of software libraries with the quantized machine learning model, wherein the quantized machine learning model with the dynamically linked predefined set of software libraries is deployed on the target device to enable autonomous operation of the target device, and wherein the software libraries are a subset of larger set of standard frameworks used for model inference.

The system achieves all the advantages and technical effects of the method of the present disclosure.

It has to be noted that all devices, elements, circuitry, units, and means described in the present application could be implemented in the software or hardware elements or any kind of combination thereof. All steps which are performed by the various entities described in the present application, as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
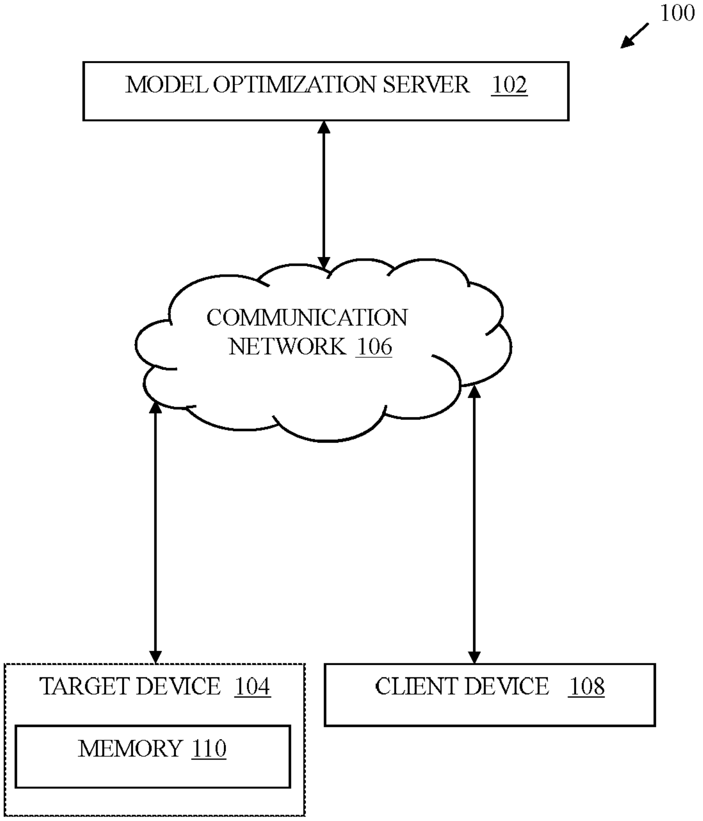
FIG. 1 is a block diagram of a system for optimizing multi-domain machine learning models, in accordance with an embodiment of the present disclosure.

FIG. 1 is a block diagram of a system for optimizing multi-domain machine learning models, in accordance with an embodiment of the present disclosure. With reference to FIG. 1, there is shown a block diagram of a system 100. The system 100 includes a model optimization server 102, a target device 104, a communication network 106, and a client device 108. In an implementation, the system 100 further includes a memory 110 inside the target device 104 communicatively coupled to the model optimization server 102 via a communication network 106. The memory 110 includes a quantized machine learning model, the identified set of software libraries, and sensor data to be loaded during the model initialization. In some implementations, the sensor data and the predefined set of software libraries may be retrieved from the memory 110, as per requirement. In some other implementations, the sensor data and the predefined set of software libraries may be stored outside the model optimization server 102, as shown in FIG. 1. The model optimization server 102 may be communicatively coupled to a plurality of client devices, such as the client device 108, via the communication network 106.

The present disclosure provides the system 100 for optimizing machine learning models for deployment on the target device 104 with limited computing resources. The system 100 processes trained machine learning models to reduce the size and computational requirements of such trained machine learning models while maintaining performance metrics. By analyzing the structure of the machine learning model and the hardware specifications of the target device 104, the system 100 creates an optimized version of the trained machine learning model suitable for deployment on the target device 104. The optimized version of the trained machine learning model exhibits proper functioning on the target device 104. The system 100 works across multiple domains, including image recognition, text analysis, and other machine learning applications. The system 100 allows the target device 104 to operate offline without requiring constant network connectivity. The system 100 significantly expands the potential applications of machine learning to environments previously limited by computational constraints.

The model optimization server 102 includes suitable logic, circuitry, interfaces, and code that may be configured to communicate with the client device 108 via the communication network 106. In an implementation, the model optimization server 102 may be a master server or a master machine that is a part of a data centre that controls an array of other cloud servers communicatively coupled to it for load balancing, running customized applications, and efficient data management. Examples of the model optimization server 102 may include, but are not limited to, a cloud server, an application server, a data server, or an electronic data processing device.

The target device 104 refers to a resource-constrained electronic computing device on which the optimized machine learning model is deployed. The target device 104 may be configured to receive a quantized machine learning model with dynamically linked libraries from the model optimization server 102, enabling the autonomous operation of machine learning capabilities. In an implementation, multiple target devices may be configured to receive the quantized machine learning model specifically optimized for the task each target device is configured to perform. Examples of the target device 104 may include but are not limited to edge IoT devices, mobile devices, embedded systems, serverless computing frameworks, smart appliances, wearable technology, autonomous vehicles, or other devices with limited computational resources.

The communication network 106 includes a medium (e.g., a communication channel) through which the client device 108 communicates with the model optimization server 102. The communication network 106 may be wired or wireless. Examples of the communication network 106 may include, but are not limited to, the Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

The client device 108 refers to an electronic computing device associated with a client. The client device 108 may be configured to send input data, commands, or configurations to the target device 104, enabling seamless communication and control. The client device 108 can function as an interface for monitoring real-time data, adjusting system parameters, or retrieving processed results from the target device 104. Examples of the client device 108 may include but are not limited to a mobile device, a smartphone, a desktop computer, a laptop computer, a Chromebook, a tablet computer, a robotic device, or other user devices.

Figure 2:
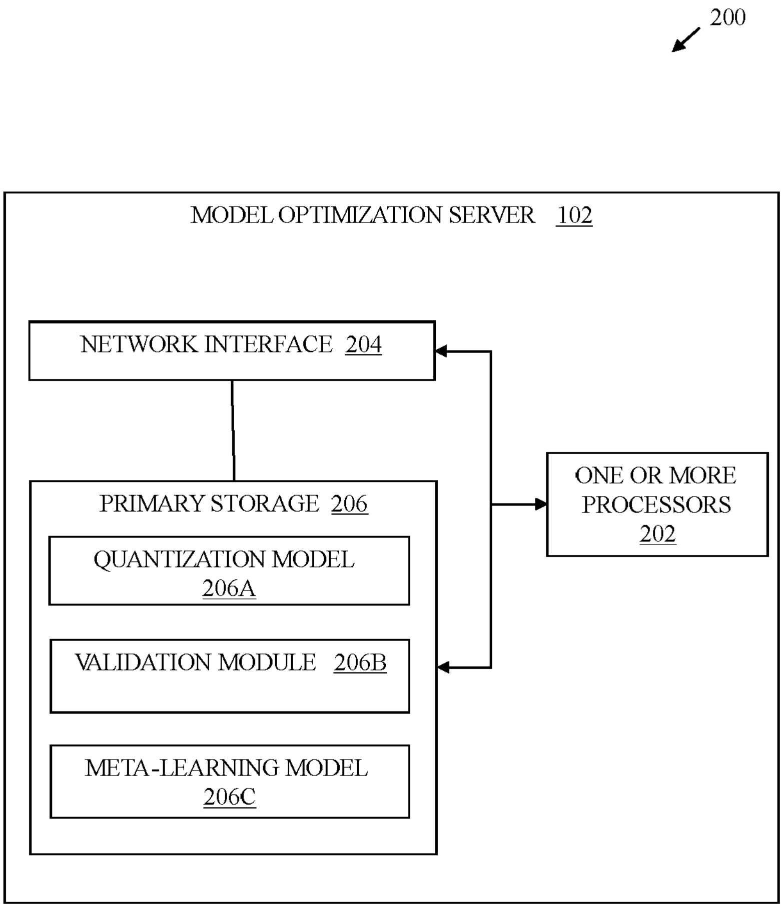
FIG. 2 is a block diagram of a model optimization server, in accordance with an embodiment of the present disclosure.

FIG. 2 is a block diagram of the model optimization server, in accordance with an embodiment of the present disclosure. FIG. 2 is described in conjunction with elements from FIG. 1. With reference to FIG. 2, there is shown a block diagram 200. The block diagram 200 includes the model optimization server 102. The model optimization server 102 includes one or more processors 202, a network interface 204, and a primary storage 206. The primary storage 206 includes a quantization model 206A, a validation module 206B, and a meta-learning model 206C.

In an implementation, the one or more processors 202 and the primary storage 206 may be implemented on the same server, such as the model optimization server 102. The model optimization server 102 includes one or more processors 202 and the primary storage 206. The model optimization server 102 may further include a network interface 204. The network interface 204 is configured to communicate with the one or more processors 202 and the primary storage 206.

The one or more processors 202 refers to a computational element that is operable to respond to and process instructions that drive the system 100. The one or more processors 202 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. In some implementations, the one or more processors 202 may be an independent unit and may be located outside the model optimization server 102 of the system 100. Examples of the one or more processors 202 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

In some implementations, there may be one master processor and several slave processors. The system 100 is controlled by the one or more processors 202, which manage and coordinate various operations of the system 100. The processor architecture may be implemented in multiple configurations based on operational requirements and the complexity of the system 100. For example, in a single processor configuration, a single master processor may handle all operations of the system 100, including the training of a machine learning model, quantization of the trained machine learning model and deployment of the quantized machine learning model. Further, in distributed processor configuration, the system 100 can employ a distributed processor architecture comprising one master processor and multiple slave processors. The master processor serves as the central control unit, managing the overall coordination of the system 100, while slave processors handle specific subsystem operations.

The master processor coordinates overall operation, manages communication between subsystems, handles high-level decision-making, and maintains synchronization. For example, a quantization system processor controls the training of the machine learning model, assigning layer-specific precision levels to each neural network layer of the trained machine learning model, communicating results to the master processor, an inference framework optimization processor manages the identification of the predefined set of software libraries required for operation, dynamically linking the predefined set of software libraries based on commands from the master processor.

Each slave processor operates under the supervision of the master processor, executing specific tasks while maintaining system-wide coordination. The distributed architecture enables parallel processing of different operations, enhancing responsiveness and throughput of the system 100. The one or more processors 202 communicate through a dedicated network, ensuring real-time data exchange and synchronized operation. In another implementation, some operations may incorporate redundant processors to ensure the reliability of the system 100. In case of processor failure, the system 100 can switch to backup processors, maintaining essential operations. The redundancy is particularly important for continuous operation in high-throughput environments.

The network interface 204 refers to a communication interface to enable communication of the model optimization server 102 to any other external device, such as the client device 108. Examples of the network interface 204 may include, but are not limited to, a network interface card, a transceiver, and the like.

The primary storage 206 refers to a volatile or persistent medium, such as an electrical circuit, magnetic disk, virtual memory, or optical disk, in which a computer can store data or software for any duration. Optionally, the primary storage 206 is a non-volatile mass storage, such as a physical storage media. Furthermore, a single primary storage may encompass and, in a scenario, and the system 100 is distributed, the one or more processors 202, the primary storage 206 and/or storage capability may be distributed as well. Examples of implementation of the primary storage 206 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The quantization model 206A controls the optimization process for machine learning models. The quantization model 206A analyses the architecture of target machine learning model to determine the precision requirements for each neural network layer. The quantization model analyses the data produced during machine learning model execution using validation datasets to determine the importance of each neural network layer. The validation dataset is a set of data used to evaluate the performance of the machine learning model during training, helping to fine-tune parameters and prevent overfitting.

Further, based on the analysis of the data produced during machine learning model execution, the quantization model 206A assigns different precision levels to each neural network layer following a set priority order. The different precision levels refer to the varying degrees of numerical accuracy assigned to different nodes of the machine learning model to balance performance, computational efficiency, and memory usage. The one or more neural network layers having a greater impact on the final output are assigned higher precision. In comparison, less significant one or more neural network layers use lower precision. The quantization model 206A provides accuracy in the output during machine learning model execution. Therefore, the quantization model 206A reduces computational load and memory usage. The quantization model 206A works in conjunction with other system components to ensure that the resulting quantized machine learning model meets performance requirements while being compatible with the resource constraints of target device 104.

In operations, the one or more processors 202 are configured to cause a meta-model to determine layer-specific precision levels for each neural network layer of a plurality of neural network layers of a trained machine learning model based on measured output activation values produced by each neural network layer during forward propagation with a validation dataset. The meta-model is a specialized machine learning model configured to analyse the structural and operational characteristics of the trained machine learning model. In other words, the meta-model is configured to determine suitable precision requirements for each neural network layer of the trained machine learning model by evaluating activation patterns, weight distributions, and computational significance during inference operations.

In an implementation, the meta-model is trained using reinforcement learning based on performance metrics collected from previous quantization operations performed on a plurality of neural network models. During the training of the meta-model, the meta-model receives details about each neural network layer of various neural network models within the system 100. The details received by the meta-model includes the position of each neural network layer in the neural network architecture, the type of operation the neural network layer performs, and how the neural network layer processes data. Based on such details, the meta-model creates quantization rules that define the required precision for each neural network layer of the machine learning model. The reinforcement learning algorithm evaluates the rules using a reward function that balances accuracy preservation against memory reduction. For instance, maintaining 98% of original accuracy while achieving 70% memory reduction might yield a high reward. Through thousands of iterations across diverse neural networks (such as convolutional neural networks, recurrent neural networks, and transformers), the meta-model learns patterns between neural network layers and quantization strategies. The learning-based approach enables the meta-model to apply past knowledge to new machine learning models, eliminating the need for manual tuning of quantization parameters. Therefore, resulting in efficient quantization rules that reduce the machine learning model size while preserving accuracy.

In an implementation, the one or more processors 202 are configured to perform clustering on training data based on similarity. The training data is dependent on the type of the problem domain and includes data from past trained machine learning models associated with the problem domain. For example, for text classification, the training data includes metrics derived from past machine learning models trained for text classification. The parameters used for training include but are not limited to model architecture, hardware specifications, number of input classes, number of training data points and the like. The clustering of the training data comprises partitioning the training data using unsupervised learning techniques to identify data subsets with similar characteristics within each problem domain. The clustering improves the efficiency of the machine learning model by reducing redundant computations and improving feature learning for better inference output.

In another implementation, the one or more processors 202 are configured to perform principal component analysis (PCA) on the training data to extract data patterns. The training data consists of a large set of complex elements (such as images, texts, or numbers) that the machine learning model must learn from. However, some of the complex elements of the training data may be repetitive or redundant, increasing computational complexity and hindering efficient learning. The PCA is a mathematical technique that simplifies the training data by retaining essential features while removing less useful features. The system 100 automatically implements PCA on the training data for improving the training of the machine learning model. The PCA helps in reducing the size of the training data without losing useful information. For example, when processing image data with thousands of pixel values, the PCA may reduce the image data to 50-100 principal components that capture 95% of the variance in the training dataset. The dimensionality reduction eliminates redundant information from the training dataset while preserving the useful and distinguishing features, resulting in more efficient machine learning model training and reduced computational requirements during both machine learning model training and inference. The data derived from PCA is utilized to train the meta-model for quantization, to correlate with inputs. The meta-model uses the data derived from PCA to learn and predict quantization maps. The quantization maps help the meta-model in determining the output values during forward propagation.

In yet another implementation, the one or more processors 202 train the machine learning model using the extracted data patterns to obtain the trained machine learning model. The one or more processors 202 feed the extracted data patterns (training dataset with dimensionality reduction) from the PCA as input features to the neural network architecture and initialize model weights using standard initialization techniques such as Xavier initialization and He initialization. During the training of the machine learning model, the one or more processors 202 perform forward and backward propagation through the neural network architecture, adjusting weights. The weights are adjusted via gradient descent with techniques such as Adam or RMSprop optimization algorithms to minimize a predetermined loss function. By training the machine learning model on the extracted data patterns rather than raw data, the one or more processors 202 achieve faster convergence, reduced overfitting, and better generalization capabilities.

The meta-model functions as an analytical framework measuring output activation values during forward propagation with validation datasets to identify the relative importance of each neural network layer of the trained machine learning model. The output activation values refer to the numerical values produced by each neural network layer when processing an input data. The output activation values determine how much influence each neural network layer has on the final output. The final output is compared using the validation datasets. The validation datasets are used to assess the performance of the trained machine learning model, ensuring the trained machine learning model provides suitable output to unseen data. Thereby, eliminating the neural network layers from the trained machine learning model without affecting the output and turning the trained machine learning model into the quantised machine learning model.

In an implementation, in order to determine layer-specific precision levels, the one or more processors 202 are configured to evaluate the statistical distribution of weight values in each neural network layer and contribution of each neural network layer for accuracy of the quantized machine learning model. The quantization model 206A analyses weight histograms for each neural network layer of the machine learning model. The quantization model 206A is configured to calculate metrics such as dynamic range, standard deviation, and outlier presence. For example, neural network layers with uniformly distributed weights concentrated in a narrow range might be suitable for quantization to 2-bit precision. In contrast, neural network layers with irregular distributions and useful outliers might require 8-bit precision.

Additionally, the quantization model 206A performs sensitivity analysis by temporarily quantizing individual neural network layers and measuring the accuracy impact on the output. The quantization model 206A isolates the contribution of each layer to overall machine learning model performance. By combining weight distribution analysis with accuracy contribution assessment, the quantization model 206A makes informed decisions about precision allocation, enabling suitable compression without compromising the functionality of the machine learning model and ensuring efficient resource utilization on the target device 104.

The one or more processors 202 are further configured to assign the determined layer-specific precision levels to each neural network layer according to a predetermined priority order to create the quantized machine learning model. The one or more processors 202 include the quantization model 206A. The quantization model 206A assigns the determined layer-specific precision levels by mapping each neural network layer to the corresponding precision level as determined by the meta-model. For neural network layers identified as highly significant by the meta-model, the quantization model 206A might assign 8-bit precision, while assigning 4-bit or 2-bit precision to less useful neural network layers. The assignment of determined layer-specific precision levels is based on the predetermined priority order.

The predetermined priority order ranks the neural network layers based on the influence on the output of the machine learning model. For example, in an image recognition model, early convolutional layers that extract fundamental features might receive higher precision than intermediate layers. By selectively reducing precision rather than applying uniform quantization across all neural network layers, the one or more processors 202 creates a quantized image recognition model that reduces memory requirements and computational complexity while preserving accuracy in the output of the trained machine learning model.

In an implementation, the predetermined priority order is determined based on a significance score calculated for each neural network layer. One or more neural network layers from the plurality of neural network layers with higher significance scores are assigned higher precision levels. The quantization model 206A calculates significance scores by analyzing how the output of each neural network layer propagates through the neural network and affects the final output. The calculation involves techniques such as computing partial derivatives of the loss function with respect to the output of each neural network layer, measuring information flow through activation patterns, and evaluating how perturbations in each neural network layer affect final outputs. For example, in a natural language processing model, attention mechanism layers might receive high significance scores due to direct impact on prediction quality. Once calculated, the significance score establishes a clear hierarchy among neural network layers, with decision-making layers receiving normalized scores above 0.8 (on a 0-1 scale) while auxiliary layers might score below 0.3. The predetermined priority order reduces the computational resources of the trained machine learning model. Thereby, preserving model performance while substantially reducing overall computational requirements.

In an implementation, the one or more processors 202 are further configured to perform loss evaluation in each neural network layer at one or more predefined checkpoints to measure accuracy degradation by computing a difference metric between full-precision tensor outputs and corresponding quantized tensor outputs at each checkpoint. The one or more processors 202 include the validation module 206B. The validation module 206B executes the loss evaluation in each neural network by temporarily running both the trained machine learning model and the quantized machine learning model. The validation module 206B performs loss evaluation up to predefined checkpoints in the neural network layers. The validation module 206B calculates difference metrics such as Mean Squared Error (MSE), Kullback-Leibler divergence, or cosine similarity between the resulting activation tensors for both the trained machine learning model and the quantized machine learning model. For example, in an image classification model, the validation module 206B might evaluate the difference in MSE between both the trained machine learning model and the quantized machine learning model. after each convolutional block, with values below 0.01 indicating acceptable quantization. Such evaluations at predefined checkpoints provide insights into how quantization affects information flow at different stages of the neural network architecture, allowing the validation module 206B to identify quantization errors.

In another implementation, the one or more processors 202 are further configured to perform loss evaluation in each neural network layer at one or more predefined checkpoints to measure accuracy degradation by calculating a cumulative error value based on the computed difference metrics across all evaluated checkpoints. The validation module 206B aggregates the computed difference metrics for all predefined checkpoints across all the neural network layers into a weighted sum. The weighted sum represents the accumulated numerical discrepancies introduced by precision reduction across the neural network. The calculation applies useful weights to different checkpoints based on the proximity to output layers, with later layers typically receiving higher weights due to a more direct impact on final output. For instance, in a natural language processing model, errors in the final attention layers might be weighted at 0.5, while errors in early embedding layers might be weighted at 0.1. The validation module 206B compares the cumulative error value against predefined thresholds to assess the overall quantization quality of the quantized machine learning model.

In yet another implementation, the one or more processors 202 are further configured to perform loss evaluation in each neural network layer at one or more predefined checkpoints to measure accuracy degradation by comparing the cumulative error value against predetermined error thresholds to determine whether to adjust quantization parameters. The validation module 206B establishes threshold values through empirical analysis of performance degradation patterns, typically setting critical thresholds at levels where accuracy begins to drop non-linearly. When the calculated cumulative error exceeds such thresholds, the validation module 206B triggers an adaptive adjustment process that revises precision levels for problematic layers in the quantized machine learning model. For example, if a speech recognition model shows a cumulative error of 0.28 against a threshold of 0.25, the validation module 206B might automatically increase precision in the layers contributing most to the error. The predetermined error thresholds create a feedback loop that continuously refines the quantization strategy based on measured performance impacts, ensuring the final quantized model maintains an appropriate balance between size reduction and accuracy preservation and resulting in a quantized machine learning model that maximizes resource efficiency while still meeting minimum quality requirements.

In an implementation, the one or more predefined checkpoints are located at one or more first neural network layers with fan-out connections to multiple subsequent neural network layers. For example, in a ResNet architecture, the checkpoints monitor errors at locations where feature maps split into residual and main paths. The checkpoints are placed at such locations because errors at fan-out points multiply through multiple branches of the neural network, causing compounded degradation in accuracy, prediction, and output of the quantized machine learning model.

In another implementation, the one or more predefined checkpoints are located at one or more second neural network layers following non-linear activation functions. The checkpoints are positioned at one or more second neural network layers following non-linear activation functions like Rectified linear unit (ReLU), sigmoid, or hyperbolic tangent (tanh), where the transformation of input values is most vital and may enhance the visibility of quantization errors.

In another implementation, the one or more predefined checkpoints are located at one or more third neural network layers implementing batch normalization operations. The batch normalization operations standardize feature distributions in each layer of the plurality of neural network layers. The batch normalization operation is highly affected by lower precision, especially when dealing with very small values (values close to zero). Even minor errors in such values can lead to noticeable changes in the final normalized output of the quantized machine learning model, impacting the accuracy of the quantized machine learning model.

In another implementation, the one or more predefined checkpoints are located at one or more fourth neural network layers with reduced dimensionality. The one or more predefined checkpoints monitor bottleneck layers (neural network layers vital in predicting output) with reduced dimensionality. For example, the middle layer in an encoder-decoder structure or dimensionality reduction layers in CNN architectures, where information is compressed, and every value of the neural network layer influences the computations and predictions of the quantized machine learning model.

In yet another implementation, the one or more predefined checkpoints are located at one or more fifth neural network layers immediately preceding the final output nodes of the machine learning model. Finally, the one or more predefined checkpoints are positioned at one or more fifth neural network layers immediately preceding the final output nodes of the quantized machine learning model. In the one or more fifth neural network layers, any quantization error directly impacts prediction quality. By monitoring the predefined checkpoints, the validation module 206B can precisely identify where quantization affects the trained machine learning model behaviour most. Therefore, enabling precision adjustments in each neural network layer that maintain accuracy while maximizing memory and computational savings.

The one or more processors 202 is further configured to train the meta-learning model 206C using the trained machine learning model to predict software library configurations. The meta-learning model 206C is a machine learning system that learns from past experiences to improve the training and optimization of new models, enabling faster adaptation and better performance across different tasks.

The training of the meta-learning model 206C involves analysing the computational graph from past trained machine learning models. The data from the past trained machine learning models helps the meta-learning model 206C to identify dependencies between operations and required software library configurations. The meta-learning model 206C also consumes past trained machine learning model benchmarks for training performance, accuracy, resource consumption, and speed of model convergence to identify dependencies between operations and required software library configurations. In an implementation, the meta-model is trained on historical performance data including model architecture parameters, hardware specifications, and optimization results from previously trained machine learning models. The historical performance data includes training and validation losses for each epoch, differential rates of loss reduction, and final weights after each epoch. The data from past trained machine learning models are encoded into a hardware feature vector that serves as input to the meta-learning model 206C.

The one or more processors 202 is further configured to utilize the trained meta-learning model to identify a predefined set of software libraries required for operation based on hardware specifications of the target device 104 and specific tasks to be executed on the target device 104. The meta-learning model 206C categorizes the target device 104 based on hardware specifications, such as distinguishing between a Raspberry Pi Zero (single-core 1 GHz ARM processor, 512 MB RAM) and a Jetson Nano (quad-core ARM processor, 4 GB RAM, 128-core NVIDIA Maxwell GPU). The hardware specifications for the target device 104 help in eliminating the set of software libraries that may not function properly in the target device 104 or do not support the target device 104.

Similarly, the meta-learning model 206C identifies a predefined set of software libraries specific tasks to be executed on the target device 104. The meta-learning model 206C analyses the computational graph of the quantized machine learning model to determine the types of tasks the quantized machine learning model is configured to perform. For example, an object detection model requires primarily convolutional operations while a language model needs attention mechanisms. The meta-learning model 206C then predicts the useful library configuration for the target device 104. For instance, when deploying to an ARM-based IoT device with no floating-point hardware acceleration, the meta-learning model 206C might select integer-only math libraries over floating-point alternatives. By identifying the predefined set of software libraries, the meta-learning model 206C reduces the resource consumption of the quantized machine learning model on the target device 104.

In another implementation, in order to utilize the trained meta-learning model to identify the predefined set of software libraries, the one or more processors are further configured to analyze the hardware specifications of the target device 104 comprising one or more of processor architecture, available memory, cache size, and hardware acceleration capabilities of the target device 104. The one or more processors 202 performs a query to retrieve hardware specifications of the target device, like ARM Cortex-A72 architecture with 1 GB RAM, 256 KB L2 cache, and Mali-G52 GPU with two compute units. The hardware specifications received from the query are encoded as numerical feature vectors where each dimension represents a specific capability (e.g., processor clock speed, memory size, cache levels). For example, an IoT device with a 900 MHz processor and 512 MB RAM would produce a different feature vector than a smartphone with 2.4 GHz processor and 4 GB RAM. The one or more processors 202 then feed such hardware specification vectors into the meta-learning model 206C to identify hardware-compatible libraries that will perform efficiently within the constraints of the target device 104. The hardware specification for identifying the predefined set of software libraries prevents the selection of software libraries that exceed available resources or lack necessary hardware acceleration support, ensuring that the deployed machine learning model can execute efficiently within the specific limitations of the target device 104.

In yet another implementation, the meta-learning model 206C includes a dependency graph that maps relationships between the predefined set of software libraries for different task types within the quantized machine learning model. The dependency graph visually represents how different components of a program depend on each other. In an implementation, commonly utilized tools to generate dependency graphs are pydep and snakefood. The dependency graph is implemented as a directed acyclic graph (DAG) where nodes represent individual software libraries and edges represent functional dependencies between software libraries. The meta-learning model 206C statistically analyses the dependency graph to isolate underutilized software libraries using the dependency graph. The dependency graph calculates which software libraries are rarely or never used by other parts of the program. Nodes with few or no dependencies represent such software libraries. Once identified, the meta-learning model 206C either removes or replaces such software libraries based on the hardware specifications of the target device 104. Thereby reducing the size and improving efficiency.

For example, in a multi-domain model, the dependency graph may show that a JPEG decoding library depends on basic memory management libraries but is only needed when processing image inputs, not text inputs. The dependency graph includes weighted edges that indicate the importance of each dependency, with vital paths receiving higher weights. During runtime, the dependency graph enables the meta-learning model 206C to make intelligent decisions about library loading order and memory management. The meta-learning model 206C maps relationships between a predefined set of software libraries and usage across different tasks. The dependency graph helps avoid loading unnecessary software libraries, prevents memory fragmentation, and improves resource efficiency during the quantized machine learning model execution.

The one or more processors 202 are further configured to dynamically link the identified predefined set of software libraries with the quantized machine learning model. The meta-learning model 206C creates a relationship table that maps model operations to a predefined set of software library functions. During the execution of the target device 104, only the required libraries are loaded into the memory of the target device 104. For example, in a multi-domain model processing both text and images, text processing libraries are loaded only when text inputs are detected. The system 100 implements reference counting to unload software libraries when no longer needed, freeing memory for subsequent operations. The dynamic linking allows the quantized machine learning model to adapt the resource utilization based on actual runtime requirements. Therefore, reducing memory consumption and faster execution times.

In an implementation, in order to dynamically link the identified predefined set of software libraries with the quantized machine learning model, the one or more processors 202 are configured to generate the dependency graph for identifying functional relationships between the predefined set of software libraries. The dependency graph is implemented with the set of software libraries as nodes and dependencies as edges, with each edge containing metadata about the type and strength of dependency. For example, when processing a computer vision model, the graph might show that the image preprocessing library depends on both the memory management library and basic math library, creating a clear hierarchy of dependencies.

In another implementation, in order to dynamically link the identified predefined set of software libraries with the quantized machine learning model, the one or more processors 202 are further configured to load identified predefined set of software libraries into the memory 110 only when required during execution of specific neural network operations. The one or more processors 202 improves the resource consumption by ensuring that only essential libraries are present in the memory 110 at any given time, reducing unnecessary memory consumption and improving execution efficiency. The system 100 identifies the operation being performed and loads the libraries associated to the operation in the memory 110. Therefore, the system 100 reduces memory initialization overhead and improves the adaptability of the quantized machine learning model across different tasks.

In another implementation, in order to dynamically link the identified predefined set of software libraries with the quantized machine learning model, the one or more processors 202 are configured to establish runtime references between the quantized machine learning model and binary implementations of the identified predefined set of software libraries without modifying the neural network architecture. The runtime references refer to memory addresses, variables, or dependencies that a program (such as the quantized machine learning model as illustrated in the embodiment of FIG. 2) accesses while running. The runtime references help the quantized machine learning model to locate and use necessary resources, such as functions, objects, or external libraries, during execution. The quantized machine learning model creates an abstraction layer that maintains a function pointer table. The function pointer table maps neural network operations to the corresponding predefined set of software library implementations. During model initialization, the function pointer table is populated with references to the appropriate functions from the identified predefined set of software libraries based on the current hardware specifications.

In yet another implementation, in order to dynamically link the identified predefined set of software libraries with the quantized machine learning model, the one or more processors 202 are configured to unload the identified predefined set of software libraries from the memory 110 when operations from the identified predefined set of software libraries are completed. A secondary processor on the target device 104 manages usage of the identified predefined set of software libraries by tracking when operations of the neural network finish. The secondary processor on the target device 104 checks if the predefined set of software libraries is still needed. When the work of software library from the predefined set of software libraries is finished, the secondary processor on the target device 104 frees up memory and resources. To prevent frequent reloading of useful software libraries, the secondary processor on the target device 104 retains such software libraries.

The quantized machine learning model with the dynamically linked predefined set of software libraries is deployed on the target device 104 to enable autonomous operation of the target device 104. When deployed on the target device 104, the quantized machine learning model with the dynamically linked predefined set of software libraries operates autonomously without connectivity to external servers, bringing advanced machine learning capabilities to resource-constrained environments while maintaining performance within the operational constraints of the target device 104.

In an implementation, the one or more processors 202 are further configured to generate a configuration file containing the layer-specific precision levels and references to the predefined set of software libraries. The configuration file is loaded with the quantized machine learning model during execution on the target device 104. The configuration file is created in a structured format, such as JSON or Protocol Buffers that encodes the parameters determined during the quantization of the machine learning model and library selection process. For each neural network layer of the quantized machine learning model, the configuration file stores precision specifications (e.g., 8-bit for the first convolutional layer, 4-bit for intermediate layers) along with runtime parameters such as scaling factors and zero-point values required for dequantization during inference. During initialization of the quantized machine learning model on the target device 104, the configuration file is parsed first, establishing the memory layout for the quantized weights and directing the dynamic linker to the appropriate software libraries. The secondary processor of the target device 104 provides runtime adaptation to different hardware specifications without requiring multiple model versions, facilitating efficient deployment across different device specifications while maintaining consistent inference behaviour.

In an implementation, the quantized machine learning model is configured to perform operations across multiple domains comprising at least two of: image classification, object detection, text classification, text generation, and audio processing. The quantized machine learning model is configured to run on multiple domains and activate based on input type detection. For instance, when processing an image, convolutional branches with quantized weights handle feature extraction, while for text input, embedding and attention mechanisms process the sequential data. For example, a product recommendation system might analyze both product images (visual domain) and customer reviews (text domain) through the respective branches before combining features for final prediction. By supporting multiple domains within a single quantized machine learning model, the system 100 eliminates the need for separate models for different input types, reducing memory requirements. The system provides multiple domain applications on a single quantized machine learning model on resource-constrained devices that would otherwise lack the capacity to run multiple specialized models simultaneously.

Figure 3:
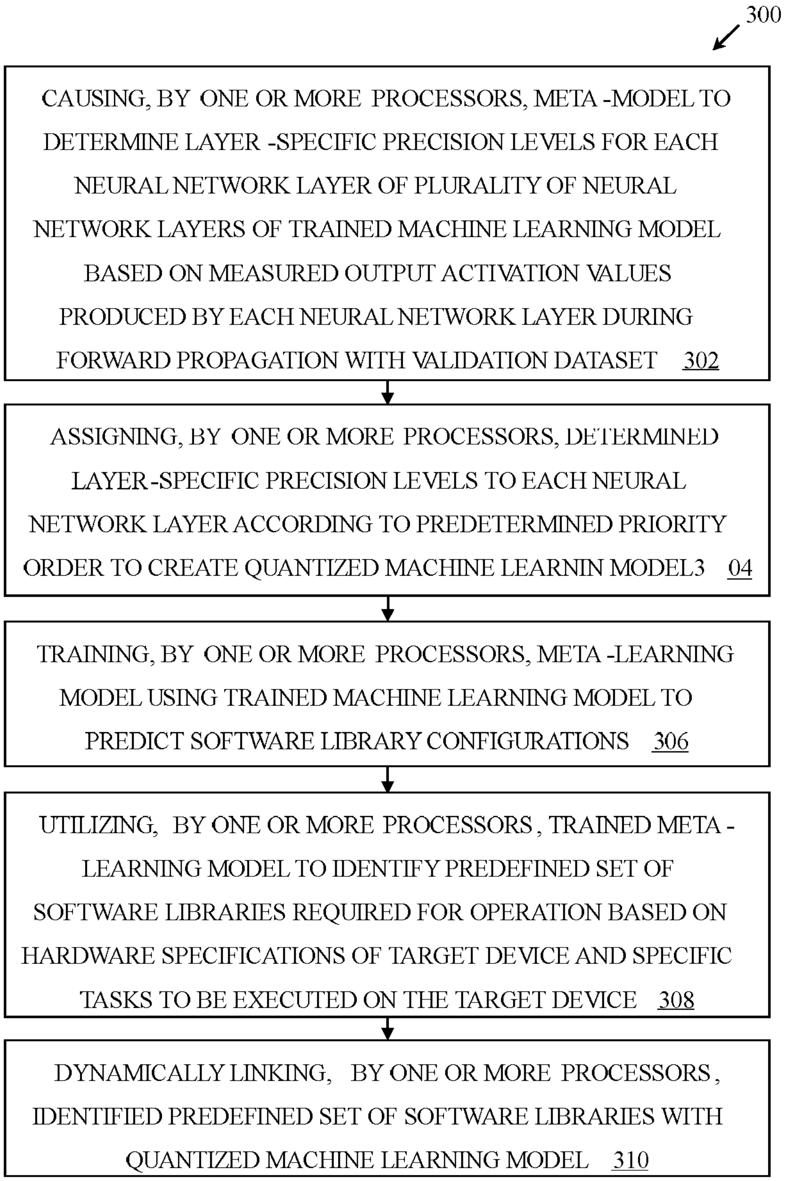
FIG. 3 is a flowchart of a method for optimizing multi-domain machine learning models, in accordance with an embodiment of the present disclosure.

FIG. 3 is a flowchart of a method for optimizing multi-domain machine learning models, in accordance with an embodiment of the present disclosure. FIG. 3 is explained in conjunction with elements from FIGS. 1 and 2. With reference to FIG. 3, there is shown a flowchart of a method 300. The method 300 is executed at the model optimization server 102 (of FIG. 1). The method 300 may include steps 302 to 310.

At step 302, the method 300 includes causing, by the one or more processors 202, the meta-model to determine layer-specific precision levels for each neural network layer based on measured output activation values produced by each neural network layer during forward propagation with the validation dataset. The precision levels for each neural network layer within the neural network refer to the varying degrees of numerical accuracy assigned to different layers based on the importance to model performance. In a machine learning model, some neural network layers contribute more significantly to the final output, while others have a lesser impact. Assigning higher precision to vital neural network layers helps maintain model accuracy, while lower precision can be used for less significant layers to reduce computational load and memory usage. The one or more processors 202 use statistical analysis and pattern recognition to assess how each neural network layer of the plurality of neural network layers of the trained machine learning model impacts the overall performance of the trained machine learning model. The meta-model analyses activation patterns produced during forward propagation with the validation dataset, measuring value distributions, activation magnitudes, and information flow across the neural network architecture.

At step 304, the method 300 includes assigning, by the one or more processors 202, the determined layer-specific precision levels to each neural network layer according to the predetermined priority order. The one or more processors 202 implement a systematic allocation of different precision formats to various neural network layers based on the quantified importance to the overall performance of the trained machine learning model. The neural network layers with higher priority in the neural network, such as those with greater influence on output accuracy, receive higher precision allocations (e.g., 8-bit). In contrast, less useful neural network layers may receive reduced precision (e.g., 4-bit or 2-bit).

In an implementation, the determining of the layer-specific precision levels includes evaluating the statistical distribution of weight values in each neural network layer and contribution of each neural network layer for accuracy of the quantized machine learning model. The evaluation process analyses weight histograms for each neural network layer, and calculates statistical measures such as mean, variance, and quantiles to characterize the distribution shape and range for determining layer-specific precision levels. The quantization model 206A performs sensitivity analysis to measure the contribution of each neural network layer in model accuracy by temporarily applying different quantization levels and observing accuracy impact. The neural network layers showing minimal accuracy degradation under 4-bit quantization receive lower precision allocations, while those demonstrating significant accuracy drops might retain 8-bit precision. By analyzing data distribution patterns and measuring accuracy contributions, the quantization model 206A suitably allocates precision levels to maximize compression. The determination of layer-specific precision levels reduces model size while preserving useful information pathways, ensuring efficient performance without loss of functionality.

At step 306, the method 300 includes training, by the one or more processors 202, the meta-learning model 206C using the trained machine learning model to predict software library configurations. The one or more processors 202 analyze the computational patterns and software library dependencies of the trained machine learning model during execution, recording which functions and software libraries are utilized for different operations within the trained machine learning model. The meta-learning model 206C develops the ability to identify a useful set of predefined software libraries for specific model architectures and tasks through supervised learning on historical library usage data. By learning from the behaviour of the past trained machine learning model, the meta-learning model 206C can predict which software libraries will be useful for deployment across the target device 104.

At step 308, the method 300 includes utilizing, by the one or more processors 202, the trained meta-learning model to identify a predefined set of software libraries required for operation. The one or more processors 202 extract and encode hardware specifications from the target device 104, including processor architecture, memory constraints, and acceleration capabilities. The hardware specifications are combined with information about the specific tasks the quantized machine learning model will perform on the target device 104 to create a comprehensive deployment context. The meta-learning model 206C analyses data through a trained prediction system to create an optimized list of required libraries from the predefined set of software libraries for the target device 104. By considering both hardware limits and computational demands, the meta-learning model 206C ensures the selected libraries from the identified predefined set of software libraries run while supporting all vital model functions.

In an implementation, the utilizing of the trained meta-learning model to identify the predefined set of software libraries includes analyzing the hardware specifications of the target device 104 comprising one or more of processor architecture, available memory, cache size, and hardware acceleration capabilities of the target device 104. The one or more processors 202 are configured to perform a query to retrieve hardware specifications of the target device, like ARM Cortex-A72 architecture with 1 GB RAM, 256 KB L2 cache, and Mali-G52 GPU with two compute units. The hardware specifications received from the query will be encoded as numerical feature vectors where each dimension represents a specific capability (e.g., processor clock speed, memory size, cache levels). For example, an IoT device with a 900 MHz processor and 512 MB RAM would produce a different feature vector than a smartphone with 2.4 GHz processor and 4 GB RAM. The one or more processors 202 are then configured to feed such hardware specification vectors into the meta-learning model 206C to identify hardware-compatible libraries that will perform efficiently within the constraints of the target device 104. The hardware specification for identifying the predefined set of software libraries prevents the selection of software libraries that exceed available resources or lack necessary hardware acceleration support, ensuring that the deployed machine learning model can execute efficiently within the specific limitations of the target device 104.

At step 310, the method 300 includes dynamically linking, by one or more processors 202, the identified predefined set of software libraries with the quantized machine learning model. The meta-learning model 206C is configured to create a relationship table that maps model operations to a predefined set of software library functions. During the execution of the target device 104, only the required libraries are loaded into the memory 110 of the target device 104. For example, in a multi-domain model processing both text and images, text processing libraries are loaded only when text inputs are detected. The system 100 implements reference counting to unload software libraries when no longer needed, freeing memory for subsequent operations. The dynamic linking allows the quantized machine learning model to adapt the resource utilization based on actual runtime requirements. Therefore, reducing memory consumption and faster execution times.

The multi-domain machine learning models are optimized through intelligent precision management and dynamic library configuration. The system 100 determines layer-specific precision levels for neural network layers based on measured output activation values, creating quantized models that maintain accuracy while reducing computational requirements. The meta-learning model 206C predicts and identifies required software libraries based on the hardware specifications of the target device 104 and execution tasks, enabling dynamic linking of useful software libraries. The quantization model 206A incorporates reinforcement learning for the meta-model, dependency graphs for library relationships, and strategic checkpoint evaluation for measuring accuracy degradation. The system 100 enables the deployment of machine learning models across varied hardware environments while maintaining performance, reducing memory footprint through a predefined set of software library loading or unloading, and supporting multi-domain operations, including image classification, object detection, text processing, and audio analysis without architectural modifications.

The steps 302 to 310 are only illustrative, and other alternatives can also be provided where one or more steps are added, one or more steps are removed, or one or more steps are provided in a different sequence without departing from the scope of the claims herein.

The method 300 may provide a more accurate and efficient way of optimizing multi-domain machine learning models. The method 300 enhances the efficiency and effectiveness of machine learning inference by optimizing model execution for resource-constrained environments. The method 300 enables efficient deployment of cross-domain machine learning models on edge IoT devices and serverless frameworks by reducing computational load and memory usage. The method 300 further streamlines precision allocation and library management, ensuring that the machine learning model operates with minimal resource consumption while maintaining accuracy.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

I claim:

1. A system for optimizing multi-domain machine learning models, comprising:

one or more processors configured to:

cause a meta-model to determine layer-specific precision levels for each neural network layer of a plurality of neural network layers of a trained machine learning model based on measured output activation values produced by each neural network layer during forward propagation with a validation dataset;

assign the determined layer-specific precision levels to each neural network layer according to a predetermined priority order to create a quantized machine learning model;

train a meta-learning model using the trained machine learning model to predict software library configurations;

utilize the trained meta-learning model to identify a predefined set of software libraries required for operation based on hardware specifications of a target device and specific tasks to be executed on the target device;

dynamically link the identified predefined set of software libraries with the quantized machine learning model, wherein the quantized machine learning model with the dynamically linked predefined set of software libraries is deployed on the target device to enable autonomous operation of the target device.

2. The system as claimed in claim 1, wherein the one or more processors are configured to:

perform clustering on a training data based on similarity;

perform principal component analysis on the training data to extract data patterns; and train a machine learning model using the extracted data patterns to obtain the machine learning model.

3. The system as claimed in claim 1, wherein the meta-model is trained using reinforcement learning based on performance metrics collected from previous quantization operations performed on a plurality of neural network models.

4. The system as claimed in claim 1, wherein the predetermined priority order is determined based on a significance score calculated for each neural network layer, wherein one or more neural network layers from the plurality of neural network layers with higher significance scores are assigned higher precision levels.

5. The system as claimed in claim 1, wherein the meta-learning model comprises a dependency graph that maps relationships between the predefined set of software libraries for different task types within the quantized machine learning model.

6. The system of claim 5, wherein, in order to dynamically link the identified predefined set of software libraries with the quantized machine learning model, the one or more processors are configured to:

generate the dependency graph for identifying functional relationships between the predefined set of software libraries;

load identified predefined set of software libraries into a memory only when required during execution of specific neural network operations;

establish runtime references between the quantized machine learning model and binary implementations of the identified predefined set of software libraries without modifying the neural network architecture; and unload the identified predefined set of software libraries from the memory when operations from the identified predefined set of software libraries are completed.

7. The system as claimed in claim 1, wherein, in order to utilize the trained meta-learning model to identify the predefined set of software libraries, the one or more processors are further configured to analyze the hardware specifications of the target device comprising one or more of: processor architecture, available memory, cache size, and hardware acceleration capabilities of the target device.

8. The system as claimed in claim 1, wherein the one or more processors are further configured to generate a configuration file containing the layer-specific precision levels and references to the predefined set of software libraries, wherein the configuration file is loaded with the quantized machine learning model during execution on the target device.

9. The system as claimed in claim 1, wherein the quantized machine learning model is configured to perform operations across multiple domains comprising at least two of: image classification, object detection, text classification, text generation, and audio processing.

10. The system as claimed in claim 1, wherein, in order to determine layer-specific precision levels, the one or more processors are configured to evaluate the statistical distribution of weight values in each neural network layer and contribution of each neural network layer for accuracy of the quantized machine learning model.

11. The system as claimed in claim 1, wherein the one or more processors are further configured to perform loss evaluation in each neural network layer at one or more predefined checkpoints to measure accuracy degradation by:

computing a difference metric between full-precision tensor outputs and corresponding quantized tensor outputs at each checkpoint;

calculating a cumulative error value based on the computed difference metrics across all evaluated checkpoints; and comparing the cumulative error value against predetermined error thresholds to determine whether to adjust quantization parameters.

12. The system as claimed in claim 11, wherein the one or more predefined checkpoints are located at:

one or more first neural network layers with fan-out connections to multiple subsequent neural network layers;

one or more second neural network layers following non-linear activation functions;

one or more third neural network layers implementing batch normalization operations;

one or more fourth neural network layers with reduced dimensionality; and one or more fifth neural network layers immediately preceding final output nodes of the machine learning model.

13. A method for optimizing multi-domain machine learning models, comprising:

causing, by one or more processors, a meta-model to determine layer-specific precision levels for each neural network layer of a plurality of neural network layers of a trained machine learning model based on measured output activation values produced by each neural network layer during forward propagation with a validation dataset;

assigning, by the one or more processors, the determined layer-specific precision levels to each neural network layer according to a predetermined priority order to create a quantized machine learning model;

training, by the one or more processors, a meta-learning model using the trained machine learning model to predict software library configurations;

utilizing, by the one or more processors, the trained meta-learning model to identify a predefined set of software libraries required for operation based on hardware specifications of a target device and specific tasks to be executed on the target device;

dynamically linking, by the one or more processors, the identified predefined set of software libraries with the quantized machine learning model, wherein the quantized machine learning model with the dynamically linked predefined set of software libraries is deployed on the target device to enable autonomous operation of the target device.

14. The method as claimed in claim 13, wherein the utilizing of the trained meta-learning model to identify the predefined set of software libraries comprises analyzing the hardware specifications of the target device comprising one or more of: processor architecture, available memory, cache size, and hardware acceleration capabilities of the target device.

15. The method as claimed in claim 13, wherein the determining of the layer-specific precision levels comprises evaluating the statistical distribution of weight values in each neural network layer and contribution of each neural network layer for accuracy of the quantized machine learning model.

16. The method as claimed in claim 13, further comprising:

performing clustering on a training data based on similarity;

performing principal component analysis on the training data to extract data patterns; and training a machine learning model using the extracted data patterns to obtain the trained machine learning model.

17. The method as claimed in claim 13, further comprising generating a configuration file containing the layer-specific precision levels and references to the predefined set of software libraries, wherein the configuration file is loaded with the quantized machine learning model during execution on the target device.

18. The method as claimed in claim 13, further comprising: performing loss evaluation in each neural network layer at one or more predefined checkpoints to measure accuracy degradation by:

computing a difference metric between full-precision tensor outputs and corresponding quantized tensor outputs at each checkpoint;

calculating a cumulative error value based on the computed difference metrics across all evaluated checkpoints; and comparing the cumulative error value against predetermined error thresholds to determine whether to adjust quantization parameters.

19. The method of claim 13, further comprising:

generating the dependency graph for identifying functional relationships between the predefined set of software libraries;

loading identified predefined set of software libraries into a memory only when required during execution of specific neural network operations;

establishing runtime references between the quantized machine learning model and binary implementations of the identified predefined set of software libraries without modifying the neural network architecture; and unloading the identified predefined set of software libraries from the memory when operations from the identified predefined set of software libraries are completed.

* * * * *